United States Patent [19]
Dell et al.

[11] Patent Number: 6,070,255
[45] Date of Patent: May 30, 2000

[54] ERROR PROTECTION POWER-ON-SELF-TEST FOR MEMORY CARDS HAVING ECC ON BOARD

[75] Inventors: Timothy J. Dell, Colchester, Vt.; Kamal E. Dimitri, Tucson, Ariz.

[73] Assignee: International Business Machines Corporation, Armonk, N.Y.

[21] Appl. No.: 09/086,176

[22] Filed: May 28, 1998

[51] Int. Cl.[7] .................................................. G06F 11/00
[52] U.S. Cl. ............................................. 714/48; 714/764
[58] Field of Search ................................. 714/36, 41, 48, 714/764, 49, 52, 54

[56] References Cited

U.S. PATENT DOCUMENTS

| | | |
|---|---|---|
| 5,068,851 | 11/1991 | Bruckert et al. . |
| 5,263,032 | 11/1993 | Porter et al. ............................. 714/764 |
| 5,291,494 | 3/1994 | Bruckert et al. . |
| 5,450,422 | 9/1995 | Dell . |
| 5,588,112 | 12/1996 | Dearth et al. . |

*Primary Examiner*—Robert W. Beausoliel, Jr.
*Assistant Examiner*—Christopher A. Revak
*Attorney, Agent, or Firm*—William N. Hogg

[57] ABSTRACT

A method and device are provided for a SIMM or DIMM which has ECC on board and which is configured to operate during and only during the power-on-self-test operation to determine if an error has been detected in memory on the read cycle in the memory test during POST and flag that error to the CPU through the memory controller even though the error has been corrected on the SIMM or DIMM card.

20 Claims, 2 Drawing Sheets

ERROR PROTECTION POWER-ON-SELF-TEST FOR MEMORY CARDS HAVING ECC ON BOARD

FIELD OF THE INVENTION

This invention relates generally to error detecting and reporting for SIMM's or DIMM's having error correction code on board. More particularly, this invention relates to providing a structure and method for trapping and reporting errors detected during power-on-self-test (POST) performed on the boot cycle of a computer where an error has occurred with respect to the data stored in the SIMM or DIMM and has been corrected on the SIMM or DIMM for transmission back to the CPU.

BACKGROUND OF THE INVENTION

The data integrity requirements for personal computer systems have grown rapidly in the past years. At the present time, newer operating systems and applications require a great deal of memory, and the amount of memory which can be accommodated in personal computer systems continues to increase rapidly. Such personal computer systems in the past have typically been provided only with the capability of writing and checking parity if even that. Added integrity requirements continue to increase the need for error correction code to be added to the system on the SIMM or DIMM cards so that errors occurring during the read cycle of data stored on the SIMM or DIMM are corrected before they are transmitted back to the CPU. One such system is shown in commonly assigned U.S. Pat. No. 5,450,422 which is incorporated herein by reference. In this system as in many others, error correction code is added to the SIMM and the correction of any errors, both hard errors and soft errors, takes place on the SIMM or DIMM card before the data is transmitted back to the CPU by the memory controller.

These ECC systems on SIMMs or DIMMs work quite well during operation. However one of the functions performed during power-on-self-tests (POST), is the detecting and flagging in some manner any errors in memory; and such errors will not normally be flagged or transmitted to the CPU if they are corrected by the ECC on the SIMM before the data is transmitted back to the CPU on a read cycle during POST. Thus the function of detecting errors in memory during POST is defeated when error correction takes place during the POST, since the system will not be notified of an error on the card during POST operations.

It is therefore a principle object of the present invention to provide a structure and method of flagging or trapping an error in the stored data in memory during a POST operation where the memory has on-board ECC and communicate that error and preferably the location thereof to the CPU during the POST cycle.

SUMMARY OF THE INVENTION

According to the present invention a method and device are provided for a SIMM or DIMM which has ECC on board and which is configured to operate during and only during the power-on-self-test operation to determine if an error has been detected in memory on the read cycle in the memory test during POST and flag that error to the CPU through the memory controlled even though the error has been corrected on the SIMM or DIMM card.

DESCRIPTION OF THE PREFERRED EMBODIMENT(S)

The present invention will be described in the environment of an IBM personal computer using an Intel 80386 or 80486 or Pentium Microprocessor and with single in-line memory modules (SIMMs) having dynamic random access memory (DRAM) chips to provide the memory function. (A SIMM is sometimes referred to as a DRAM card, which refers to the DRAM's and all chips and circuits on the SIMM.) It is to be understood however that the present invention is equally applicable to dual in-line memory modules (DIMMs) or any other type of plugable memory card.

For the purpose of this description, the CPU and its associated system will not have error correction code (ECC) logic contained within the CPU system, i.e. native ECC. However, in certain instances if ECC is native to the CPU system and is also on a SIMM and where error correction takes place on the SIMM, then this invention is applicable thereto.

Figure 1:
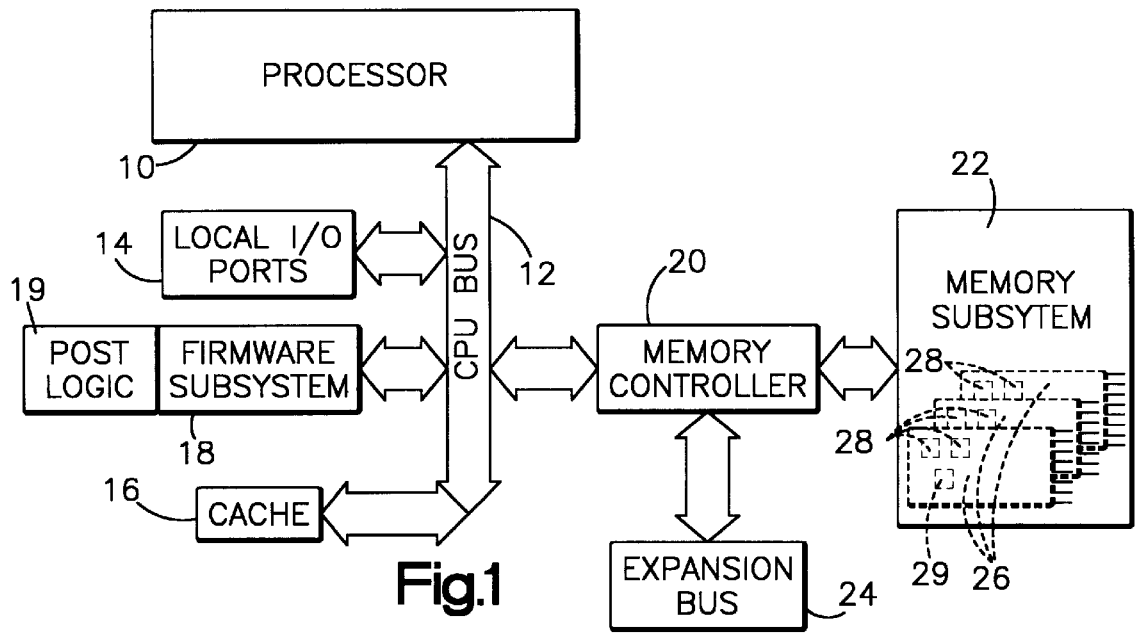
FIG. 1 is a high level diagram showing the interconnection of a personal computer with a bus and add-on memory cards according to this invention.

As can be seen in FIG. 1 there is provided a CPU or processor 10.

The CPU 10 is connected to a CPU bus 12 which may have local I/O ports 14, cache memory 16 and firmware subsystem or subsystems 18 communicating therewith. The firmware subsystem 18 includes POST logic 19 which performs power-on self test (POST) functions as is well known in the art. The POST functions typically include and for the purpose of this application, do include, a function of testing memory by writing patterns to and reading the written patterns from memory. These patterns are comprised of various combinations of "1's" and "0's" written in a predetermined manner; and, following writing of the patterns, the contained patterns are read and checked for errors. As noted above, the system 10 does not have a native ECC. Typically and for the purpose of this invention, the patterns will vary but will include at least alternating checkboard patterns of "1's" and "0's" and may include walking ones and ripple patterns. The POST logic 19 also includes, as a part thereof, some technique for dealing with errors when errors are detected in the memory during power-on-self-test. These techniques of dealing with errors can include without limitation an automatic rebooting of the computer, a signaling on the screen of the error, or allowing the computer to function (this is particularly prevalent with error correction code (ECC) that is native to the computer and thus correction can be accomplished and the computer system run in normal operation), or in some instances the further operation of the computer is halted which can be either temporary until an override command is given by the user or may be permanent until the memory is replaced. In any event, POST logic 19 includes a response of some type to detected errors. The particular response is dictated by the code written into the BIOS (basic input/output system) and as indicated above may vary from system to system. In any event, it is an error during testing of memory during the POST that is detected, flagged and initiates such response on the part of the BIOS. Of course, for the BIOS to be able to initiate such action when an error is present, the fact that there is an error must be transmitted or communicated to the POST logic 19 located on the CPU bus 12.

A memory controller 20 is provided on the CPU bus 12 which controls the writing and reading of data to and from memory subsystem 22. An expansion bus 24 may also be provided and controlled by the memory controller 20. The memory subsystem 22 typically comprises at least one and as depicted several memory cards 26 which in the preferred embodiment are SIMMs, each of which is provided with DRAM chips 28 and ASIC chips 29 which perform the error correction function for the data stored in the DRAMs 28 as shown in commonly assigned U.S. Pat. No. 5,450,422, incorporated by reference herein.

Figure 2:
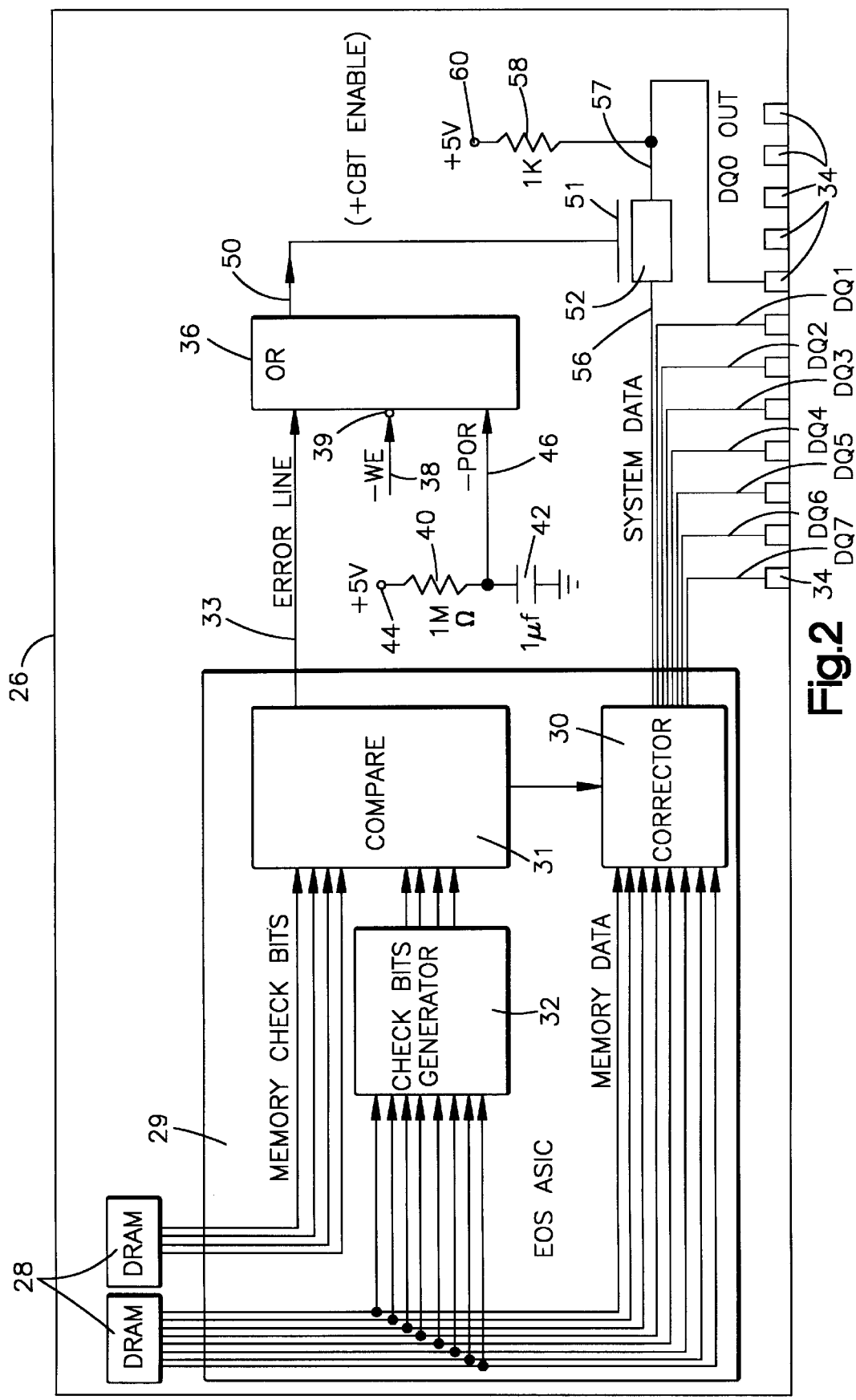
FIG. 2 is a diagrammatic view of the output of the memory and the logic for flagging an error during POST even when the error has been corrected on the memory card.

Referring now to FIG. 2, each ASIC 29 includes a corrector 30 which is connected to receive memory data from the DRAMs 28, and a compare signal from compare circuitry 31 which compare the check bits generated by circuitry 32 against the memory. The ASIC 29 also includes a checkbit generator 32 which generates the check bits from the memory data on DRAM's 28. The corrector and compare circuitry operate in a convention way as described in U.S. Pat. No. 5,540,422 and the corrector 30 outputs corrected system data which has corrected any single bit errors, and in some cases some multiple bit errors and the compare circuitry 31 provides an error signal if an error occurs on error line 33. In this case the normal state where there is not an error is a "+" or a "1" and when an error is detected the error line is driven negative to read a 110. The data output lines from the corrector communicate on data lines DQ0–DQ7 through pins 34 on the SIMM 26. For illustration, an 8 bit data bus is shown, but in practice 16, 32 and 64 bit buses are common and work the same way. Also, it should be understood that there could be any number of ASICs 29. For example, on a checkbit bus system wherein the data is stored in a single DRAM a single ASIC 29 is used for each DRAM; however, if the architecture is for a 32 bit bus or 64 bit bus for data, a single ASIC chip could be used in connection with the entire width of the data on the bus or an ASIC could be provided for each DRAM. (It should be noted that all of the pins 34 are normally used for other purposes such as data & memory control signal lines, but not memory error signal lines, and because industry standard SIMMs/DIMMs do not provide a connector pin for an error signal line thus error line 33 cannot be directly transmitted to the CPU bus.)

Still referring to FIG. 2, the error line 33 communicates as one input to a three input OR gate 36. A write enable line 38 also communicates with the OR gate 36 through an inverter 39. Also in this case, the write enable line is active low or "0" on a write cycle and high or positive or a "1" during a read cycle. An RC network comprised of a resistor 40 and a capacitor 42 are provided which are attached to a voltage source 44. A power-on reset line 46 extends from the RC network between the resistor 40 and capacitor 42 and provides the third input to OR gate 36. This line is also negative or "0" during power-on reset, but is by virtue of the RC network of resistor 40 and 42 and voltage source 44 positive during normal operations. The reason for this configuration will be explained presently.

Output 50 from the OR gate is supplied to gate electrode 51 of a switch 52. This switch 52 is a CBT 3126 switch manufactured by Texas Instruments Inc. which has a positive enable; i.e., the switch is an FET which is turned on when a voltage is applied to the gate electrode 51.

As indicated above, there are a plurality of data output lines designated generally as DQ0–DQ7 eight of which are shown, but the number of which can vary as indicated above. One of the DQ data output lines in this case DQ0 is attached by line 56 to the input of switch 52. Output line 57 of switch 52 is connected through a resistor 58 to a voltage source 60. In one embodiment where the system voltage is 5 volts, the voltage sources 44 and 60 also preferably are 5 volt voltage sources.

The RC network comprised of the resistor 40 and capacitor 42 is selected such that the time for the power-on line 46 to reach the switching threshold of the OR gate 36 is less than the time it takes for entire power-on reset cycle to be completed, but long enough so that the POST test involving testing of the memory is completed. The time to complete the entire POST cycle typically for many computers is from 1 to 10 seconds. In such a case, a one Mohm resistor with a one uF capacitor provides the proper time constant. The resistor 58 should be selected such that together with the distributed capacitance of the circuit, it can be easily overcome by the action of the write driver or the read driver when the switch 52 is closed, the operation of which will be described presently the resistor 58 is selected such that the line 57 is pulled up in about 5 to 10 ns.

The circuitry shown in FIG. 2 operates as follows:

OR gate 36 will provide an output signal when any one or more of the inputs to OR gate 36 from error line 33, write enable line 38, or power-on reset line 46 is a "1" or positive. If any one or more of these lines is a "1", the switch 52 will be turned on. If none of these lines provide a positive input to OR gate 36, the switch 52 will be turned off. If the switch 52 is turned off, the voltage source 60 through resistor 58 will pull up the DQ0 output line 56 to a positive or "1" valve. If however, the switch 52 is closed or active, the write driver or the read driver is strong enough to overcome the small voltage exerted by the voltage source 60 through resistor 58 and will drive the line 56 or line 57, either positive for a "1" or negative for a "0" depending on what is being either written to or read from memory.

Assuming now that the computer is in the "off" state, i.e. power-off, and the power is then turned on. This will initially cause the POST circuitry 19 to go through its power-on self test cycle, which as indicated above typically takes from 1 to 10 seconds. When the computer is turned on the 5 volt source 44 and the 5 volt source 60 are both turned on. At this point, the RC network comprised of resistor 40 and capacitor 42 has not reached the threshold voltage for switching so that the power-on reset line 46 is low or negative and will remain so for at least 1 and up to 10 seconds depending on the time that the performing of POST test takes. The error line 33 in its normal state is "+" or high and thus will provide a positive signal to OR gate 36. Since there is at least one high signal to OR gate 36 (i.e. line 33), the output 50 from the OR gate 36 will turn the switch 52 "on". Also at this point there is no activity yet of the write enable line 36, which is normally high or "1" when inactive, but the inverted input to the OR gate will be "0" or low. However, as long as there is one high input to the OR gate, which at this point in the test is the error line 33, the output from OR gate 36 will be high or "+" and thus the switch 52 will be closed and the value read or line DQ will be the value sent to the CPU.

As was indicated above, the POST test includes writing a series of "0's" and "1's" to the memory and then reading the memory to see that the same pattern is read that had been written. If when the write enable line 38 is actuated for a write cycle and since write enable is active low, and the signal from write enable is inverted, a positive input will be provided to the OR gate 36 thus assuring that the switch 52 is on during a write cycle. During the write cycle, the write drivers will overcome the action of the voltage source 60 and write the prescribed pattern of "1's" and "0's" to the DRAMs in a conventional manner for a POST.

Following the write cycle, a read cycle is performed. During a read cycle the write enable line in inactive high or a "1" which is inverted as input to OR gate as a "0". If this is still within the time before this power-on reset line 46 is switched high, the power-on line 46 will be "0" and the output of the written pattern of "1's" and "0's" is read from the DRAMs through the ASIC 29. As indicated the ASIC 29 includes a corrector 30 which will, because of the error correction code, correct any errors in the read data, i.e. any single bit errors and some double bit errors found in which the read data varies from the written data. Thus all of the data on the DQ lines DQ0 though DQn will be good data and would compare to the write data even though an error data occurred. Hence, if this good data were returned to the CPU, the POST logic would interpret the data as being good data even though there had been an error detected in the comparing of the read data.

However, the purpose of the POST as indicated above is to determine if there were an error. Hence if no error occurs, the error line 33 which in its normal state is a "+" or "1" will continue to provide a positive input to OR gate 36. This will in turn cause the switch 52 to remain closed and the data will be read out as good data as indeed it was since no error was detected and corrected.

If however, an error was detected, the error line 33 will go negative. Since this is a read cycle, the write enable line hi is not active and hence the input from the write enable line 38 through invertor 39 will also be low or negative; and, since this is during power-on reset, line 46 will be low, the RC network not having reached its switching threshold. Therefore, all three inputs to the OR gate 36 are negative, in which case the output of the OR gate on line 50 is negative or low which will turn "off" the switch 52. When the switch 52 is turned off, whatever corrected value is on the input to the switch 52 will not be passed through the switch 52; rather the output side of the switch 52 will be pulled high by the voltage source 60 through the resistor 58. Thus this will always read as a "1" on the line during a read cycle as long as the switch 52 is open since the write driver is inactive and the read driver on the line DQ0 input to the switch 52 is isolated from the output side. Thus, even though a corrected value is put on DQ0, if an error occurs, the DQ0 line will be isolated from the output of the switch 52 and a "1" will always be present and delivered to the CPU bus 12 from the memory controller on a read cycle during power-on reset if an error has occurred whether or not it was corrected. Since at least some of the time in performing the memory checking during the power-on self test, a "0" will be written to the location connected to the DQ0 line, if the error occurs any where in the memory, the output of the line DQ0 through switch 52 will be pulled to a "1" even though the error on whatever line it has occurred is corrected. Thus the power-on self test circuitry 19 will receive a "1" when the data expected is a "0", thus indicating an error.

(It should be understood that connection of resistor 58 to voltage source 60 to provide a "high" or "1" on the line DQ0 could be replaced with a resistor connected to ground. This would provide a "low" or "0" output when switch 52 is degating line DQ0.)

At or toward the conclusion of the power-on POST testing of the memory, the RC circuit comprised of the resistor 40 and capacitor 42 driven by voltage source 44 will have raised the power-on reset line 46 to above the switching level for the OR gate 36. As noted above, with this configuration this time is normally between, about 1 and 10 seconds. At this point, the power-on reset line 46 will then go high which will provide a high output or a "1" output from OR gate 36 on line 50 which will actuate the switch 52 putting the DQ0 line in the circuit and thus operable by the read drivers and write drivers irrespective whether or not an error appears on the line since once the power-on reset or POST test is completed and normal operation occurs the power-on line will remain continuously high providing the necessary voltage to the gate 51 of the switch 52 leaving the switch 52 on during normal operations.

Figure 3:
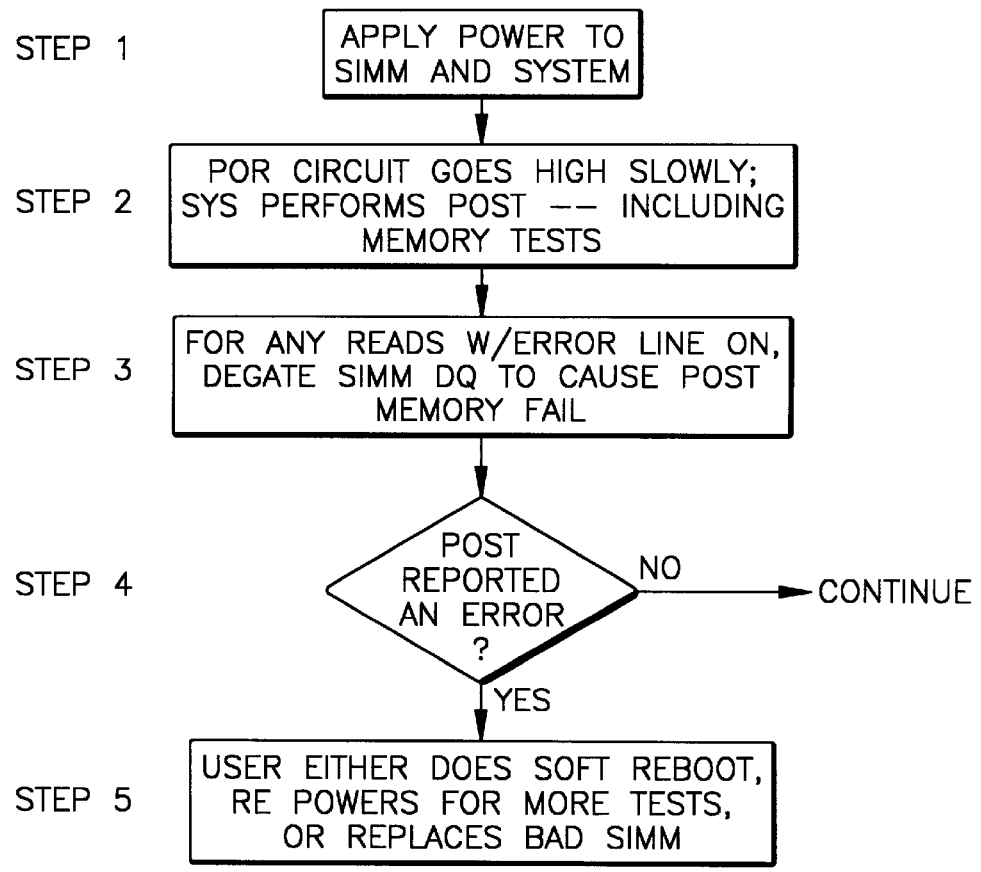
FIG. 3 is a flow chart depicting the operation of the circuitry shown in FIG. 2.

A summary of the operation as described above is shown in the flow chart shown in FIG. 3. As shown therein, at step 1 power is applied to the SIMM. At step 2, the power-on reset circuit goes high slowly, and the system performs the POST power-on self test including memory test. For any reads with an error, the DQ0 line of the SIMM is degated causing a "1" to be applied or read by the system as shown in step 3. Step 4 of the POR reports an error/no error. If no error occurs, the test continues; if an error is detected, the system reboots, or signals an error to the user or shuts down. Thus the error is reported to the CPU 10 and the CPU responds by doing a soft reboot or repowering for more tests or giving an error notification to the user or some combination of the above actions.

While the invention has been described above as it is used on SIMMs that are connected to CPUs that do not have native ECC, the invention can also be used with SIMMs that are connected to CPUs that have native ECC if the error correction is performed on the SIMM. Such SIMMs with ECC are shown in co-pending applications Ser. No. 09/032, 153; Filed Feb. 27, 1998; Entitled Method and Apparatus for ECC Protection in a Computer System with Non-Parity Memory which is incorporated herein by reference.

The use of such ECC on SIMM when there is native ECC in the CPU is useful to catch and correct errors occurring during data transfer on the system buses as the bus speeds and complexity increase.

While the present invention has been illustrated by the description of embodiments thereof, and while the embodiments have been described in considerable detail, it is not the intention of application to restrict or in any way limit the scope of the appended claims to such detail. Additional advantages and modifications will readily appear to those skilled in the art. For example, but not by way of limitation, certain procedures may be called or implemented in different sequences and certain procedures may be subroutined into one or more subroutines. Therefore, the invention, in its broader aspects, is not limited to the specific details, the representative apparatus, and illustrative examples shown and described. Accordingly, departures may be made from such details without departing from the spirit or scope of the applicant's general inventive concept.

It is claimed:

1. A memory card for use in a computer, which memory card has data storage and data lines to provide data to and receive data from the memory storage, and wherein said memory card includes error correction capabilities to correct at least any single bit data error read from storage onto said data lines comprising;

logic circuitry to determine if an error has been corrected;

logic circuitry to degate at least one data line responsive to an error correction detected; and circuitry to apply a given logic value to said at least one data line for transmission to a CPU irrespective of the value supplied to the data lines from error correction when and only when said at least one data line is degated.

2. The invention as defined in claim 1 wherein said logic circuitry to degate said at least one data line includes selection circuitry to apply said given logic value to said at least one data line only during a given period of operation of a computer system.

3. The invention as defined in claim 2 wherein said given period of time is during a power-on-self-test cycle of a computer.

4. The invention as defined in claim 3 wherein said selection circuitry includes an RC network.

5. The invention as defined in claim 3 wherein said selection circuitry includes a gating device in said at least one data line, and circuitry to switch said gating device only during the power-on-self-test cycle.

6. The invention as defined in claim 5 wherein said selection circuitry includes an OR gate the output of which opens the gating device during the power-on-self-test cycle when an error is detected.

7. The invention as defined in claim 5 wherein said circuitry to apply a given logic value includes a resistor connected to said at least one data line and a given voltage value.

8. The invention as defined in claim 1 wherein said circuitry to degate said at least one data line includes an FET.

9. In combination, a CPU and a memory card connected thereto, which memory card has data storage and data lines to provide data to and receive data from the data storage, and wherein said memory card includes error correction capabilities to correct at least any single bit data error read from storage onto said data lines comprising;

logic circuitry on said memory card to determine if an error has been corrected;

logic circuitry on said memory card to degate at least one data line responsive to an error correction detected; and circuitry on said memory card to apply a given logic value to said at least one data line for transmission to the CPU irrespective of the value supplied to the data lines from error correction.

10. The invention as defined in claim 9 wherein said logic circuitry to degate said at least one data line includes selection circuitry to apply said given logic value to said at least one data line only during a given period of operation of a computer system.

11. The invention as defined in claim 10 wherein said given period of time is during a power-on-self-test cycle of a computer.

12. The invention as defined in claim 11 wherein said selection circuitry includes an RC network.

13. The invention as defined in claim 11 wherein said selection circuitry includes a gating device in said at least one data line, and circuitry to switch said gating device only during the power-on-self-test cycle when an error is detected.

14. The invention as defined in claim 13 wherein said selection circuitry includes an OR gate the output of which opens the gating device during the power-on-self-test cycle.

15. The invention as defined in claim 13 wherein said circuitry to apply a given logic value includes a resistor connected to said at least one data line and a given voltage value.

16. The invention as defined in claim 9 wherein said circuitry to degate said at least one data line includes an FET.

17. A method of communicating an error in a data bit to a CPU which data bit has been stored on a memory card attached to the CPU by a CPU bus, wherein said memory card has a plurality of data lines for the reception and delivery of data bits between the CPU bus and memory storage, and wherein said memory card has error correction capabilities thereon to correct at least any single bit data errors read onto the data lines from memory, comprising the steps of:

determining when a data bit error has occurred on a read cycle, degating at least on data line from the CPU bus when said error has occurred; and supplying to the CPU bus a given binary value from said at least one degated data line irrespective of the value on said at least one degated data line when and only when a data line error has occurred.

18. The invention as defined in claim 17 further characterized by degating said at least one data line only during a power-on-self-test cycle on the CPU.

19. The invention as defined in claim 18 further characterized by performing said degating with a RC circuit.

20. The invention as defined in claim 17 wherein said given binary value is generated through a resistor tied to a given voltage level.

* * * * *